United States Patent
Orikasa

(10) Patent No.: US 7,224,492 B2
(45) Date of Patent: May 29, 2007

(54) FACSIMILE APPARATUS CAPABLE OF DETECTING A LINE CONNECTION

(75) Inventor: Noriaki Orikasa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 770 days.

(21) Appl. No.: 10/321,327

(22) Filed: Dec. 17, 2002

(65) Prior Publication Data

US 2003/0117661 A1   Jun. 26, 2003

(30) Foreign Application Priority Data

Dec. 20, 2001 (JP) .............................. 2001-387938
Nov. 19, 2002 (JP) .............................. 2002-334744

(51) Int. Cl.
*H04N 1/00* (2006.01)
*H04M 1/00* (2006.01)

(52) U.S. Cl. ............... 358/400; 379/412; 379/399.01; 358/406

(58) Field of Classification Search ............... 358/400, 358/1.15, 406; 379/412, 399.01, 100.12, 379/93.09
See application file for complete search history.

(56) References Cited

U.S. PATENT DOCUMENTS

| 4,751,574 | A | * | 6/1988 | Mogi et al. ............... 348/734 |
| 4,910,604 | A | * | 3/1990 | Takei et al. ............... 386/95 |
| 5,321,479 | A | * | 6/1994 | Yoshida et al. ............ 399/70 |
| 5,657,381 | A | * | 8/1997 | Hughes-Hartogs ..... 379/100.12 |
| 5,774,541 | A | * | 6/1998 | Krause ..................... 379/405 |
| 5,946,393 | A | * | 8/1999 | Holcombe ............. 379/399.01 |
| 6,337,702 | B1 | * | 1/2002 | Bates et al. ................ 715/857 |
| 6,456,703 | B1 | * | 9/2002 | Lee .......................... 379/93.09 |
| 6,757,381 | B1 | * | 6/2004 | Worley ................... 379/399.01 |
| 6,778,665 | B1 | * | 8/2004 | Fischer et al. ............. 379/413 |
| 2002/0039416 | A1 | * | 4/2002 | Parrott ....................... 379/412 |

FOREIGN PATENT DOCUMENTS

| JP | 7-107178 | 4/1995 |
| JP | 200116532 | 1/2001 |
| JP | 2001-53895 | 2/2001 |
| JP | 2002-51203 | 2/2002 |

OTHER PUBLICATIONS

Claims, Abstract and Drawing for U.S. Appl. No. 09/675,100, filed Sep. 28, 2000.
Jan. 23, 2007 official action in Japanese patent application No. 2002-334744.

* cited by examiner

*Primary Examiner*—Kimberly Williams
*Assistant Examiner*—Scott Schlack
(74) *Attorney, Agent, or Firm*—Cooper & Dunham LLP

(57) ABSTRACT

A facsimile apparatus can properly detect whether or not the facsimile apparatus is connected to a line. The facsimile apparatus comprises a network control device formed of a semiconductor DAA device having a primary line control part driven by a local power supply and a secondary serial interface circuit communicating with said primary line control part through a photocoupler and a local power supply detecting part detecting a local power supply to said primary line control part. As a result, it is possible to detect whether or not the facsimile apparatus is connected to the line.

12 Claims, 9 Drawing Sheets

FACSIMILE APPARATUS CAPABLE OF DETECTING A LINE CONNECTION

BACKGROUND OF THE INVENTION

1. Field of the Invention

The present invention generally relates to facsimile apparatuses, and more particularly to a facsimile apparatus that can detect a connection of a signal line to a modular jack for a telephone line.

2. Description of the Related Art

In general, a facsimile apparatus cannot send and receive data when a line has no physical connection. If it is examined whether or not the facsimile apparatus is connected to the line by performing a hookup operation, the hookup operation is considered to be useless in that such a hookup operation is not used for its intrinsic purpose. Thus, communication service providers rarely allow a user to hook up the telephone line in order to examine the connection condition of the facsimile apparatus to the telephone line.

Japanese Laid-Open Patent Application No. 2001-16532 discloses a facsimile apparatus that can detect whether or not the facsimile apparatus is connected with a telephone line without any hookup operation by providing a detection circuit to detect a voltage applied to the telephone line.

In such a conventional facsimile apparatus, however, it is necessary to prepare a separate circuit to detect the voltage. In addition, if a calling signal is sent to the facsimile apparatus while the detection operation is being executed, it is difficult for the facsimile apparatus to find the calling signal.

SUMMARY OF THE INVENTION

It is a general object of the present invention to provide a facsimile apparatus in which the above-mentioned problems are eliminated.

A more specific object of the present invention is to provide a facsimile apparatus that can properly detect whether or not the facsimile apparatus is connected with a line.

In order to achieve the above-mentioned objects, there is provided according to one aspect of the present invention a facsimile apparatus for detecting a connection of the facsimile apparatus to a line, comprising: a network control device formed of a semiconductor DAA device having a primary line control part driven by a local power supply and a secondary serial interface circuit communicating with the primary line control part through a photocoupler; and a local power supply detecting part detecting the local power supply to the primary line control part.

According to the above-mentioned invention, it is possible to properly detect whether or not a signal line of the facsimile apparatus is connected to the line.

In the above-mentioned facsimile apparatus, the local power supply detecting part may cause the secondary serial interface circuit to establish communication with the primary line control part, and the local power supply detecting part may determine that local power is supplied when the communication is properly established and that local power is not supplied when the communication is not properly established.

Additionally, in the above-mentioned facsimile apparatus, the local power supply detecting part may provide an alert message to prompt a user to examine the connection of the facsimile apparatus to the line when the local power supply detecting part determines that no local power is supplied.

According to the above-mentioned invention, it is possible to prompt a user to examine the connection of the facsimile apparatus to the line.

Additionally, in the above-mentioned facsimile apparatus, the local power supply detecting part may cease to execute a saving operation for image information to be transmitted when the local power supply detecting part determines that no local power is supplied.

Additionally, in the above-mentioned facsimile apparatus, the local power supply detecting part may cease to execute a transmitting operation for image information to be transmitted when the local power supply detecting part determines that no local power is supplied.

According to the above-mentioned inventions, it is possible to avoid any unnecessary information saving and transmitting operation.

Additionally, in the above-mentioned facsimile apparatus, image information to be transmitted may be transferred to another facsimile apparatus when the local power supply detecting part determines that no local power is supplied.

Additionally, in the above-mentioned facsimile apparatus, image information to be transmitted may be transmitted via another line when the local power supply detecting part determines that no local power is supplied.

In order to achieve the above-mentioned objects, there is provided according to another aspect of the present invention a facsimile apparatus for detecting a connection of the facsimile apparatus to a line wherein the facsimile apparatus has an energy-saving function, comprising: a local power supply detecting part switching ON/OFF based upon a local power supply; a determination part determining whether or not the line is properly connected; and a display part displaying a message, wherein the determination part determines that the line is properly connected when the local power supply detecting part is ON and that the line is not properly connected when the local power supply detecting part is OFF, and the display part displays an alert message to prompt a user to examine the connection of the facsimile apparatus to the line when the determination part determines that the line is not properly connected.

According to the above-mentioned invention, it is possible to properly detect whether or not the signal line of the facsimile apparatus is connected to the line at an energy-saving mode.

Other objects, features and advantages of the present invention will become more apparent from the following detailed description when read in conjunction with the accompanying drawings.

DETAILED DESCRIPTION OF THE PREFERRED EMBODIMENTS

In the following, embodiments of the present invention will be described with reference to the accompanying drawings.

Figure 1:
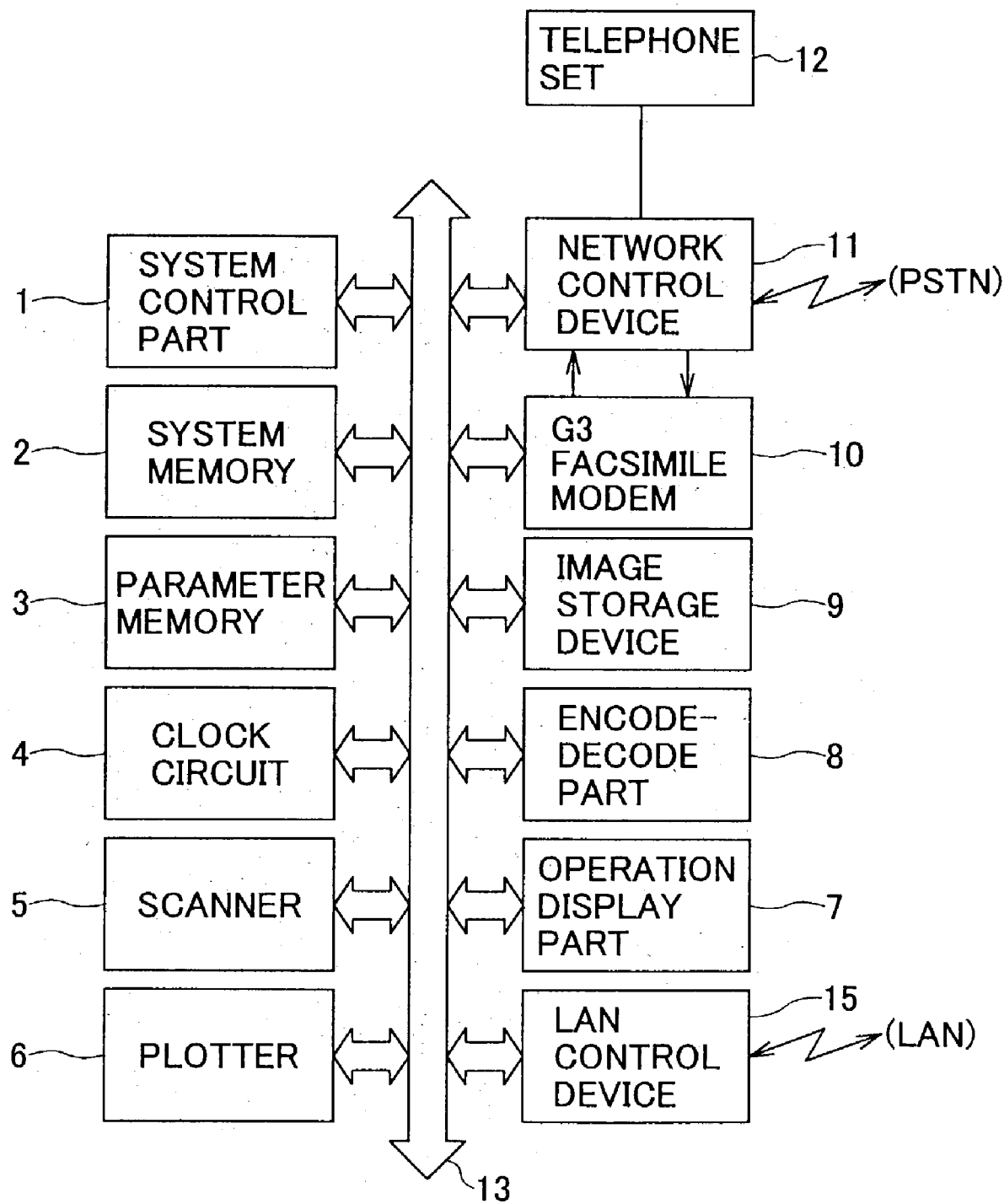
FIG. 1 is a block diagram illustrating a structure of a G3 (Group 3) facsimile apparatus according to a first embodiment of the present invention.

FIG. 1 shows a G3 facsimile apparatus according to the first embodiment of the present invention.

The G3 facsimile apparatus comprises a system control part 1, a system memory 2, a parameter memory 3, a clock circuit 4, a scanner 5, a plotter 6, an operation display part 7, an encode-decode part 8, an image storage device 9, a G3 facsimile modem 10, a network control device 11, a telephone set 12, an internal bus 13 and a LAN control device 15.

The system control part 1 controls individual parts of the G3 facsimile apparatus and operates a predetermined G3 facsimile transmission control process.

The system memory 2 is used to save a control program performed by the system control part 1 and a process program and various data necessary to execute the control program as a working area for the system control part 1.

The parameter memory 3 is used to save various information items peculiar to the G3 facsimile apparatus.

The clock circuit 4 serves to supply current time information.

The scanner 5 serves to read a manuscript image at a predetermined resolution.

The plotter 6 serves to output an image at a predetermined resolution.

The operation display part 7 serves to operate the G3 facsimile apparatus and comprises various operational keys and various display devices.

The encode-decode part 8 encodes an image signal to be compressed and decodes the encoded image information into the underlying image signal of the encoded image signal.

The image storage device 9 is used to save a large amount of encoded image information.

The G3 facsimile modem 10 serves as a modem of the G3 facsimile apparatus and has a low speed modem function (V. 21 modem) to send/receive a transmission procedure signal and a high speed modem function (V. 17 modem, V. 34 modem, V. 29 modem, V. 27ter modem and so on) to mainly send/receive image information.

The network control device 11 serves to connect the G3 facsimile apparatus to a PSTN (Public Switched Telephone Network) and has an automatic originating and terminating function.

The telephone set 12 is provided in the network control device 11 for a call.

The LAN control device 15 serves to connect the G3 facsimile apparatus to a LAN and has an automatic originating and terminating function. If the G3 facsimile apparatus is formed to serve as a scanner and a printer at the same time, the LAN control device 15 sends an image signal obtained by the scanner 5 to a PC (Personal Computer) connected to the LAN and receives an image signal to be printed by the plotter 6 from a PC connected to the LAN.

These parts: the system control part 1, the system memory 2, the parameter memory 3, the clock circuit 4, the scanner 5, the plotter 6, the operation display part 7, the encode-decode part 8, the image storage device 9, the Group 3 facsimile modem 10, the network control device 11 and the LAN control device 15 are connected to the internal bus 13. Data are transmitted between these parts mainly via the internal bus 13.

On the other hand, data are directly transmitted between the network control device 11 and the G3 facsimile modem 10 without the use of the internal bus 13.

Figure 2:
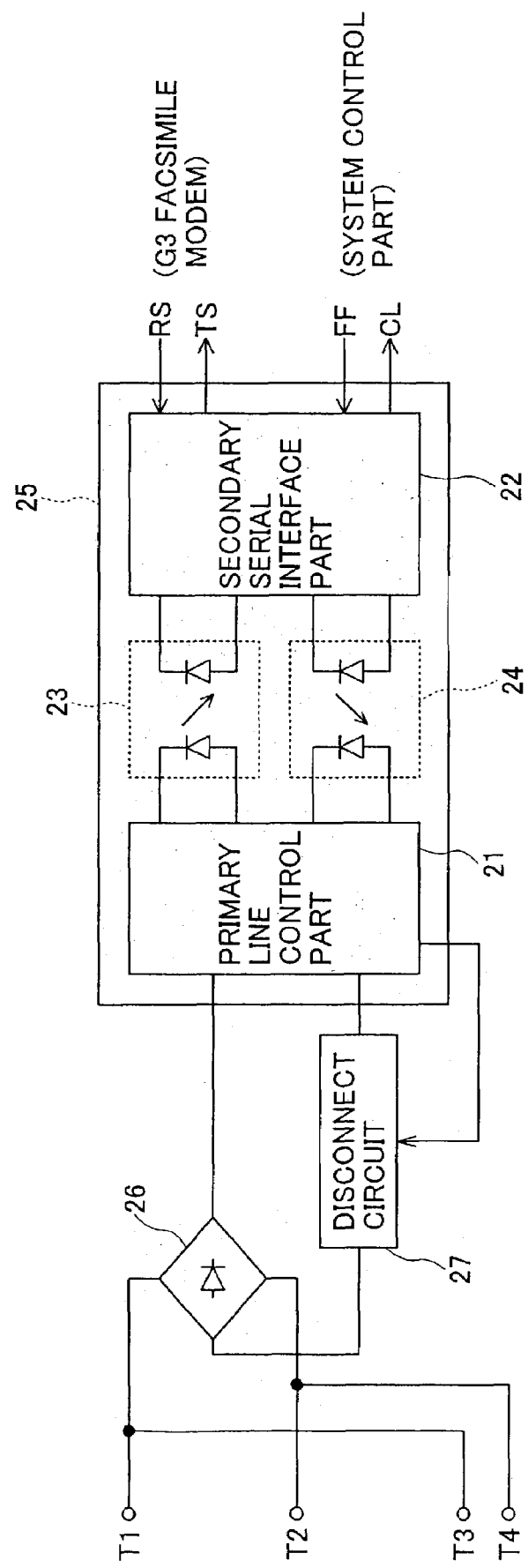
FIG. 2 is a block diagram illustrating a structure of a network control device according to the first embodiment.

FIG. 2 shows a structure of the network control device 11.

The network control device 11 includes a semiconductor DAA (Direct Access Arrangement) device 25 formed of a primary line control part 21, a secondary serial interface part 22, and a pair of photocouplers 23 and 24 whereby a signal is communicated between the primary line control part 21 and the secondary serial interface part 22.

It is noted that the semiconductor DAA device 25 is a publicity device having a publicity function and has certain functions of signal coupling between a signal line and a device, impedance matching and insulation.

A rectifier 26 is connected to terminals T1 and T2 connected to a line and a current in the line is rectified to be supplied to the primary line control part 21 via a disconnect circuit 27.

The secondary serial interface part 22 sends a transmitting signal TS to the G3 facsimile modem 10 and receives a receiving signal RS from the G3 facsimile modem 10. The secondary serial interface part 22 receives a line close signal FF from the system control part 1 and sends a signal CL to the system control part 1 when a calling signal is detected.

Also, the terminals T1 and T2 are connected in parallel with terminals T3 and T4 to have a connection with the telephone set 12.

In the above configuration, the system control part 1 instructs the G3 facsimile modem 10 to detect a line connection at a predetermined interval.

For such an instruction, the G3 facsimile modem 10 supplies a predetermined inspection signal to the secondary serial interface part 22. When the secondary serial interface part 22 receives the inspection signal, the secondary serial interface part 22 sends a predetermined signal to the primary line control part 21 and waits until the secondary serial interface part 22 receives a response signal for the predetermined signal from the primary line control part 21.

When the primary line control part 21 receives the predetermined signal from the secondary serial interface part 22, the primary line control part 21 sends the response signal to the secondary serial interface part 22.

However, when the terminals T1 and T2 are not connected to the line and a local power supply is not applied to the primary line control part 21, the secondary serial interface part 22 cannot receive the response signal from the primary line control part 21 because the primary line control part 21 cannot work without the local power supply.

Therefore, if the secondary serial interface part 22 receives the predetermined response signal from the primary line control part 21, the secondary serial interface part 22 informs the G3 facsimile modem 10 that the line is properly connected. On the other hand, if the secondary serial interface part 22 does not receive the predetermined response signal from the primary line control part 21, the secondary serial interface part 22 informs the G3 facsimile modem 10 that the line is not properly connected.

If the G3 facsimile modem 10 receives the notification that the line is properly connected from the secondary serial interface part 22, the G3 facsimile modem 10 sends the "connected" notification to the system control part 1. On the other hand, if the G3 facsimile modem 10 receives the notification that the line is not properly connected from the secondary serial interface part 22, the G3 facsimile modem 10 sends the "not connected" notification to the system control part 1.

When the system control part 1 receives the notification that the line is not properly connected from the G3 facsimile modem 10, the system control part 1 displays an alert regarding the notification on the operation display part 7 in order to prompt a user to examine the line connection. Also, the system control part 1 may display such an alert on a display part of another apparatus such as a PC via the LAN.

A description will now be given of a case in which image information to be transmitted already exists in the facsimile apparatus and a case in which image information to be transmitted is newly provided to the facsimile apparatus when the system control part 1 receives the notification that the line is not properly connected from the G3 facsimile modem 10. The former case typically occurs when the line is disconnected after the user performs a transmitting operation. The latter case typically occurs when a user tries to perform a transmitting operation without any notice of the displayed alert.

In the former case, the system control part 1 controls individual parts of the G3 facsimile apparatus so that the G3 facsimile modem 10 and other parts cannot further execute any transmitting operation for the image information. In the latter case, the system control part 1 controls individual parts of the G3 facsimile apparatus so that the image information cannot be saved in the image storage device 9. As a result, it is possible to avoid any unnecessary information saving and transmitting operation.

Here, when the G3 facsimile apparatus is connected with another G3 facsimile apparatus via a LAN, the LAN control device 15 may transmit the image information to be transmitted to the other G3 facsimile apparatus so that the other G3 facsimile apparatus can send the image information via another line.

Figure 3:
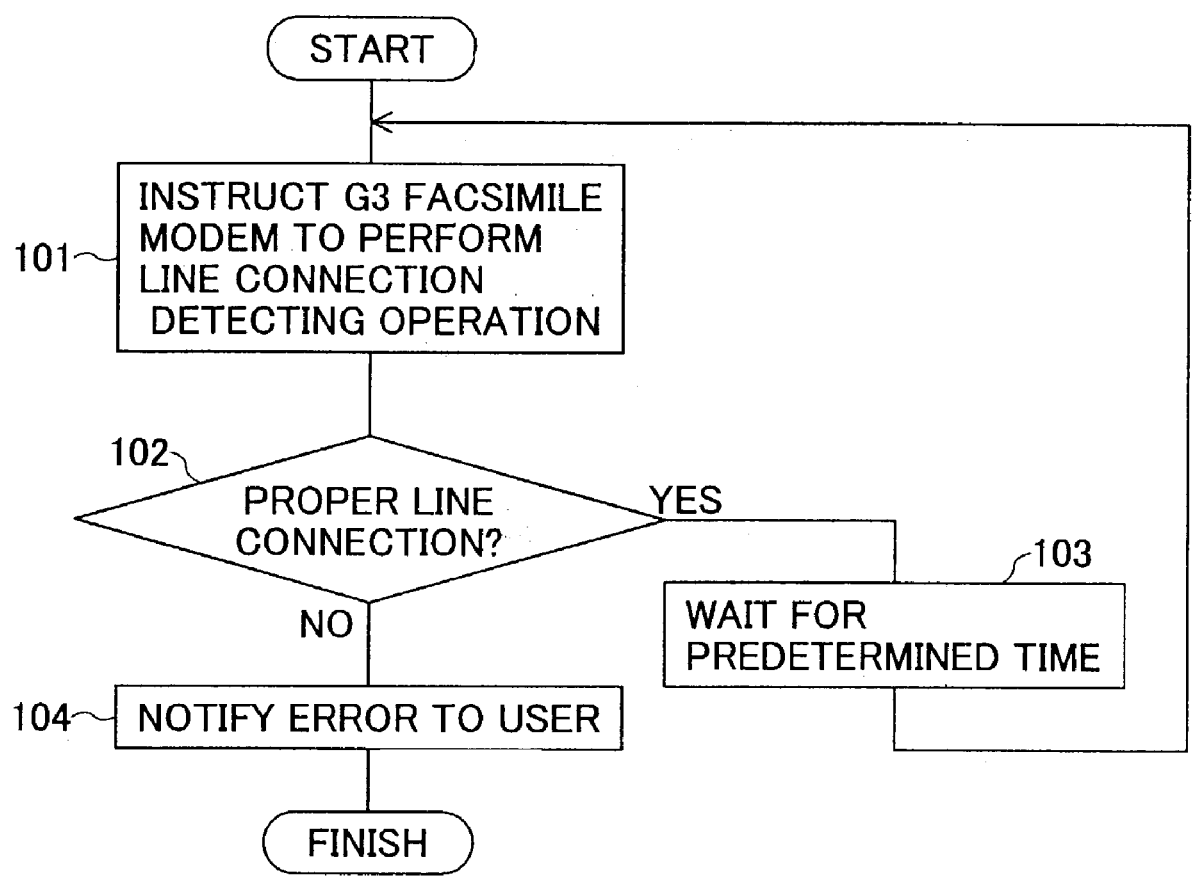
FIG. 3 is a flowchart illustrating a procedure that a system control part performs so as to detect a line connection.

FIG. 3 shows a procedure whereby the system control part 1 can examine a line connection.

At step 101, the system control part 1 instructs the G3 facsimile modem 10 to perform a line connection detecting operation. At step 102, the system control part 1 determines whether or not the notification that the line is properly connected is sent from the G3 facsimile modem 10 corresponding to the instruction. If the condition is determined to be YES at step 102, the system control part 1 waits for a predetermined time at step 103 and then returns to the step 101.

If the condition is determined to be NO, the system control part 1 shows a user the alert that the line is not connected and prompts the user to examine the line condition at step 104. At the same time, the system control part 1 controls the individual parts of the G3 facsimile apparatus so that any saving operation and any transmitting operation cannot be executed.

Figure 4:
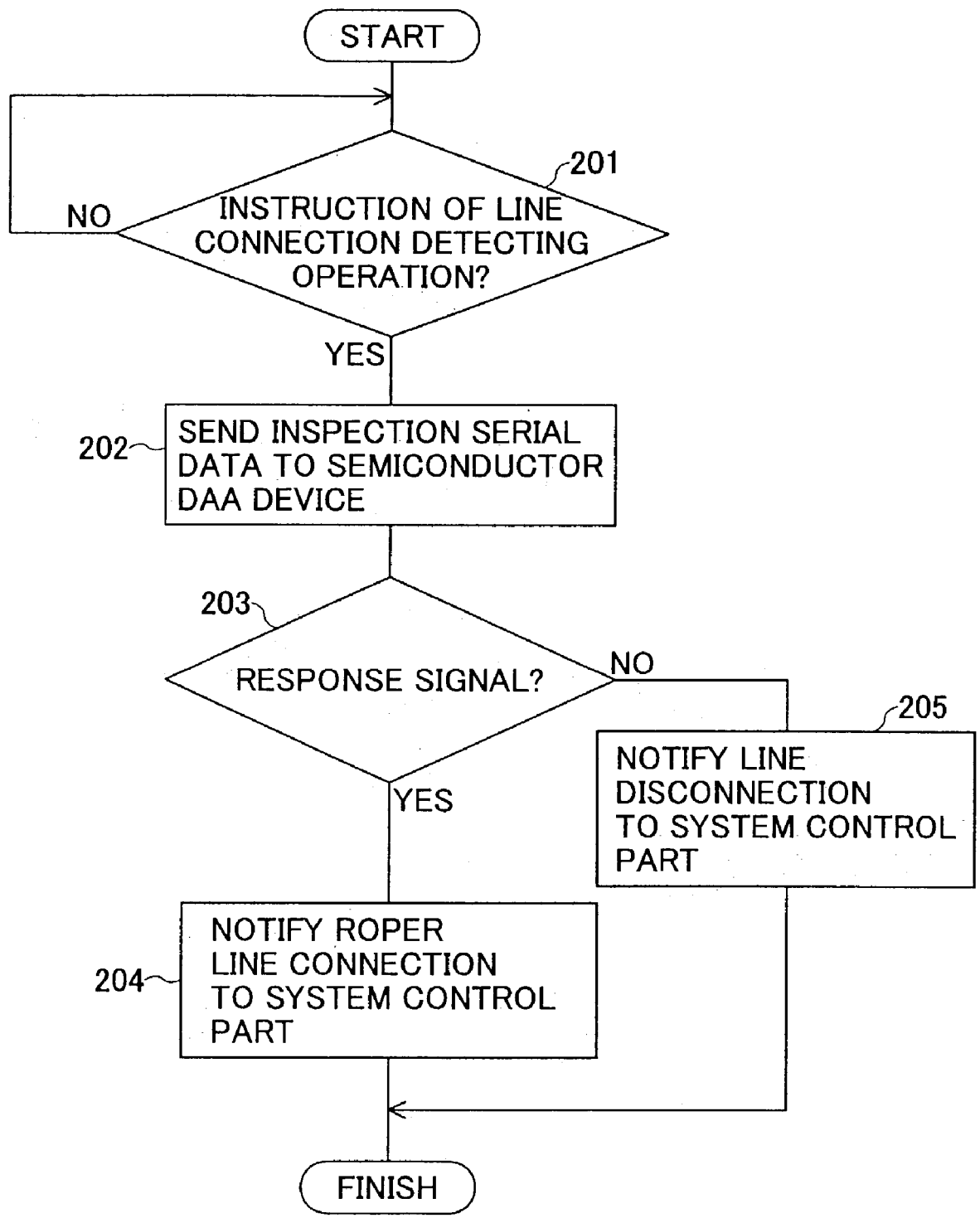
FIG. 4 is a flowchart illustrating a procedure that the G3 facsimile apparatus performs so as to detect a line connection.

FIG. 4 shows a procedure that the G3 facsimile modem 10 performs so as to examine a line connection.

When the G3 facsimile modem 10 is instructed to perform the line connection detecting operation by the system control part 1, which corresponds to YES at step 201, the G3 facsimile modem 10 transmits inspection serial data (arbitrary signal) to the semiconductor DAA device 25, that is, the network control device 11, at step 202.

When the semiconductor DAA device 25 receives the inspection serial data, the secondary serial interface part 22 sends a predetermined inspection signal to the primary line control part 21. When the primary line control part 21 receives the predetermined inspection signal, the primary line control part 21 sends the corresponding response signal to the secondary serial interface part 22.

The secondary serial interface part 22 informs the G3 facsimile modem 10 whether or not the secondary serial interface part 22 has received the response signal.

If the G3 facsimile modem 10 receives the notification that the secondary serial interface part 22 has received the response signal, which corresponds to YES at step 203, the G3 facsimile modem 10 informs the system control part 1 that the line is properly connected at step 204. If the G3 facsimile modem 10 receives an abnormal signal with respect to the response signal from the semiconductor DAA device 25, which corresponds to NO at step 203, the G3 facsimile modem 10 informs the system control part 1 that the line is not properly connected at step 205.

As mentioned above, according to this embodiment of the present invention, it is possible to determine whether or not the signal line is connected with the line.

Figure 5:
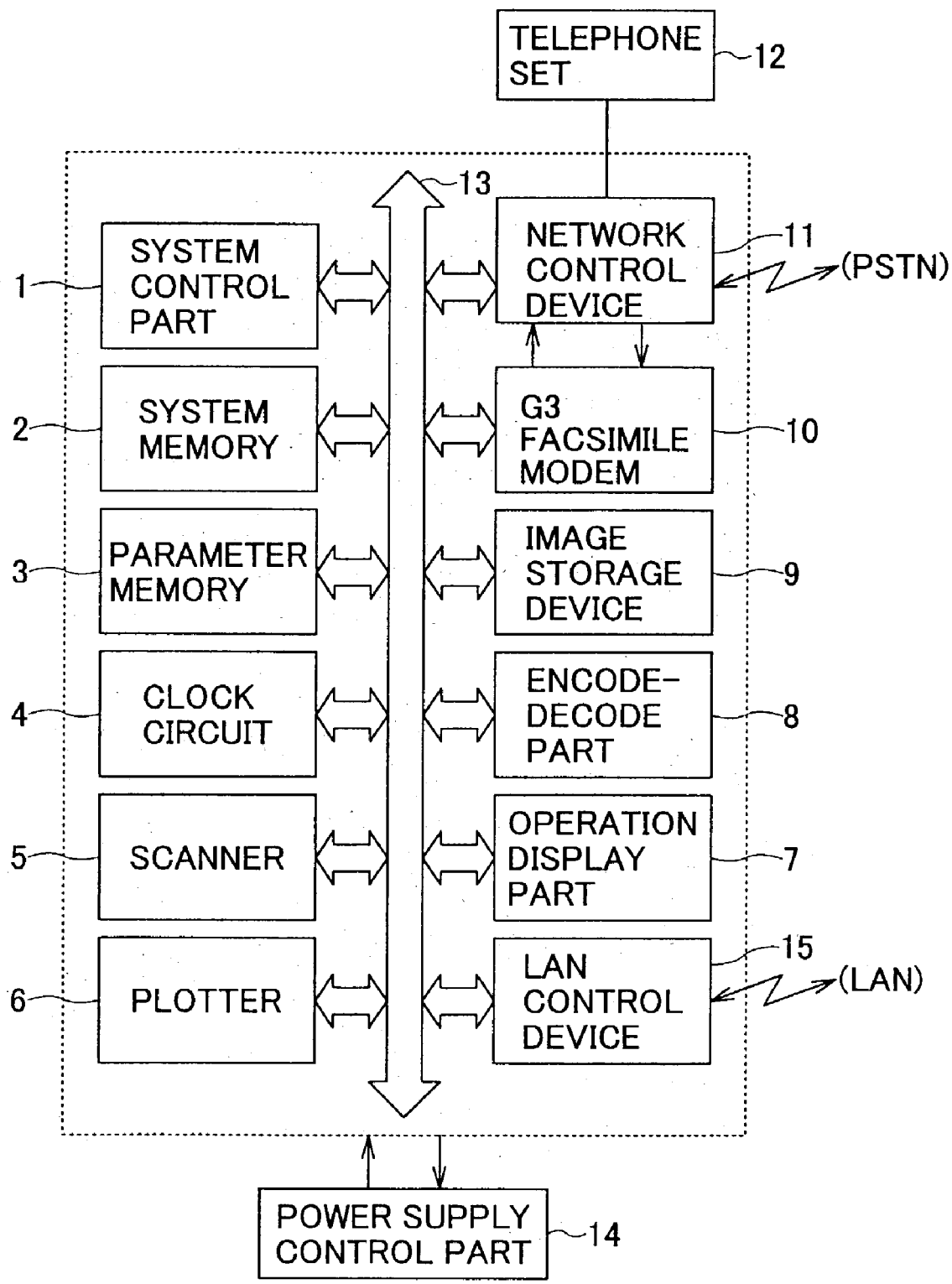
FIG. 5 is a block diagram illustrating a structure of a G3 facsimile apparatus according to a second embodiment of the present invention.

FIG. 5 shows a G3 facsimile apparatus according to the second embodiment of the present invention. This G3 facsimile apparatus has an energy-saving function. In FIG. 5, those parts that are similar to or correspond to the parts in FIG. 1 are referred to the same numerals.

The G3 facsimile apparatus comprises a system control part 1, a system memory 2, a parameter memory 3, a clock circuit 4, a scanner 5, a plotter 6, an operation display part 7, an encode-decode part 8, an image storage device 9, a G3 facsimile modem 10, a network control device 11, a telephone set 12, an internal bus 13 and a LAN control device 15.

The system control part 1 controls individual parts of the G3 facsimile apparatus and operates a predetermined G3 facsimile transmission control process.

The system memory 2 is used to save a control program performed by the system control part 1 and a process program and various data necessary to execute the control program as a working area for the system control part 1.

The parameter memory 3 is used to save various information items peculiar to the G3 facsimile apparatus.

The clock circuit 4 serves to supply current time information.

The scanner 5 serves to read a manuscript image at a predetermined resolution.

The plotter 6 serves to output an image at a predetermined resolution.

The operation display part 7 serves to operate the G3 facsimile apparatus and comprises various operational keys and various display devices.

The encode-decode part 8 encodes an image signal to be compressed and decodes the encoded image information into the underlying image signal of the encoded image signal.

The image storage device 9 is used to save a large amount of encoded image information.

The G3 facsimile modem 10 serves as a modem of the G3 facsimile apparatus and has a low speed modem function (V. 21 modem) to send/receive a transmission procedure signal and a high speed modem function (V. 17 modem, V. 34 modem, V. 29 modem, V. 27ter modem and so on) to mainly send/receive image information.

The network control device 11 serves to connect the G3 facsimile apparatus to a PSTN (Public Switched Telephone Network) and has an automatic originating and terminating function.

The telephone set 12 is provided in the network control device 11 for a call.

The LAN control device 15 serves to connect the G3 facsimile apparatus to a LAN and has an automatic originating and terminating function. If the G3 facsimile apparatus is formed to serve as a scanner and a printer at the same time, the LAN control device 15 sends an image signal obtained by the scanner 5 to a PC (Personal Computer) connected to the LAN and receives an image signal to be printed by the plotter 6 from a PC connected to the LAN.

These parts: the system control part 1, the system memory 2, the parameter memory 3, the clock circuit 4, the scanner 5, the plotter 6, the operation display part 7, the encode-decode part 8, the image storage device 9, the Group 3 facsimile modem 10, the network control device 11 and the LAN control device 15 are connected to the internal bus 13. Data are transmitted between these parts mainly via the internal bus 13.

On the other hand, data are directly transmitted between the network control device 11 and the G3 facsimile modem 10 without the use of the internal bus 13.

A power supply control part 14 is used to implement an energy-saving function in this embodiment.

A description will now be given of the energy-saving function.

Under this embodiment of the present invention, the system control part 1 shifts to an energy-saving mode when the waiting condition continues for more than a predetermined period of time or when a user chooses the energy-saving mode. In this case, the system control part 1 informs the power supply control part 14 that the system control part 1 is shifting to the energy-saving mode.

When the energy-saving mode is not valid (not in use), the power supply control part 14 supplies electric power to individual parts of the G3 facsimile apparatus in a normal power supply mode. On the other hand, when the energy-saving mode is valid, the power supply control part 14 supplies electric power only to parts serving to detect a factor to trigger the cancellation of the energy-saving mode and provides no electric power to the other parts.

Hence, in the energy-saving mode, electric power is supplied to a manuscript detecting part of the scanner 5, an operation detecting part of the operation display part 7 serving as an energy-saving mode cancellation switch and a terminating signal detecting part of the network control device 11, and no electric power is provided to the other parts.

When the manuscript detecting part of the scanner 5, the operation detecting part of the operation display part 7 or the terminating signal detecting part of the network control device 11 supplies a manuscript detection signal, an operation detection signal or a terminating signal detection signal, respectively, the power supply control part 14 cancels the energy-saving mode and then provides electric power to all parts of the G3 facsimile apparatus.

Figure 6:
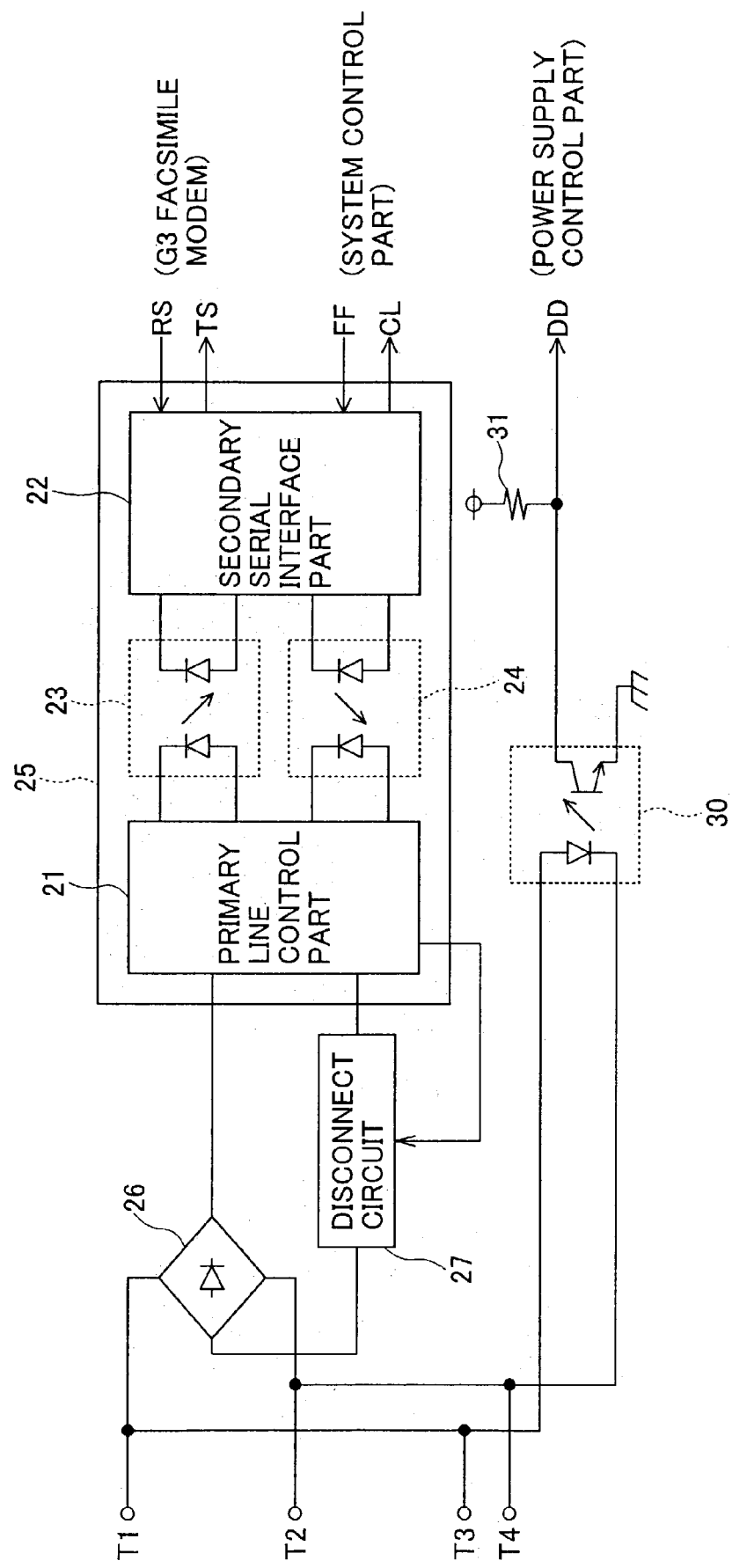
FIG. 6 is a block diagram illustrating a structure of a network control device according to the second embodiment of the present invention.

FIG. 6 shows a structure of the network control device 11, wherein those parts that are similar to or correspond to the parts in FIG. 2 are referred to as the same numerals.

The network control device 11 includes a semiconductor DAA device 25 formed of a primary line control part 21, a secondary serial interface part 22, and a pair of photocouplers 23 and 24 whereby a signal is communicated between the primary line control part 21 and the secondary serial interface part 22.

It is noted that the semiconductor DAA device 25 is a publicity device having a publicity function and has certain functions of signal coupling between a signal line and a device, impedance matching and insulation.

A rectifier 26 is connected to terminals T1 and T2 connected to a line and a current in the line is rectified to be supplied to the primary line control part 21 via a disconnect circuit 27.

The secondary serial interface part 22 sends a transmitting signal TS to the G3 facsimile modem 10 and receives a receiving signal RS from the G3 facsimile modem 10. The secondary serial interface part 22 receives a line close signal FF from the system control part 1 and sends a signal CL to the system control part 1 when a calling signal is detected.

Also, the terminals T1 and T2 are connected in parallel with terminals T3 and T4 to have a connection with the telephone set 12.

A photocoupler 30 that switches ON/OFF in accordance with a line signal is connected to the terminals T1 and T2. A detection signal DD of the photocoupler 30 is pulled up by a resistor 31, and the resulting signal is supplied to the power supply control part 14.

If the terminals T1 and T2 are connected with the line and local electric power is applied, the photocoupler 30 becomes ON, thereby supplying the output signal DD at the LOW logical level.

Under this state, if a calling signal (alternating current signal at 16 Hz) is provided, the detection signal DD of the photocoupler 30 alternately repeats ON/OFF at a predetermined period because the photocoupler 30 is switched ON and OFF in accordance with the frequency of the calling signal.

On the other hand, if the terminals T1 and T2 are not connected to the line, the photocoupler 30 becomes OFF, thereby supplying the detection signal DD at the HIGH logical level.

Consequently, according to this embodiment of the present invention, when the G3 facsimile apparatus is in the normal power supply mode, that is, when the G3 facsimile apparatus is not in the energy-saving mode, it is possible to determine whether or not the line is connected by following the same procedure as the above-mentioned first embodiment of the present invention.

On the other hand, when the G3 facsimile apparatus is in the energy-saving mode, it is possible to determine whether or not the line is connected based upon the logical level of the detection signal DD of the photocoupler 30. Namely, at the energy-saving mode, when the detection signal DD is LOW, it is concluded that the line is properly connected. When the logic level of the detection signal DD is alternating, it is concluded that a terminating signal is being detected. Furthermore, when the detection signal DD is HIGH, it is concluded that the line is not properly connected.

When it is determined that the line is not properly connected, for example, when there arise some errors, the energy-saving mode is cancelled and the G3 facsimile apparatus is booted and an error alert is displayed on the operation display part 7 of the G3 facsimile apparatus.

In this embodiment, the power supply control part 14 may detect the terminating signal at the energy-saving mode.

Figure 7:
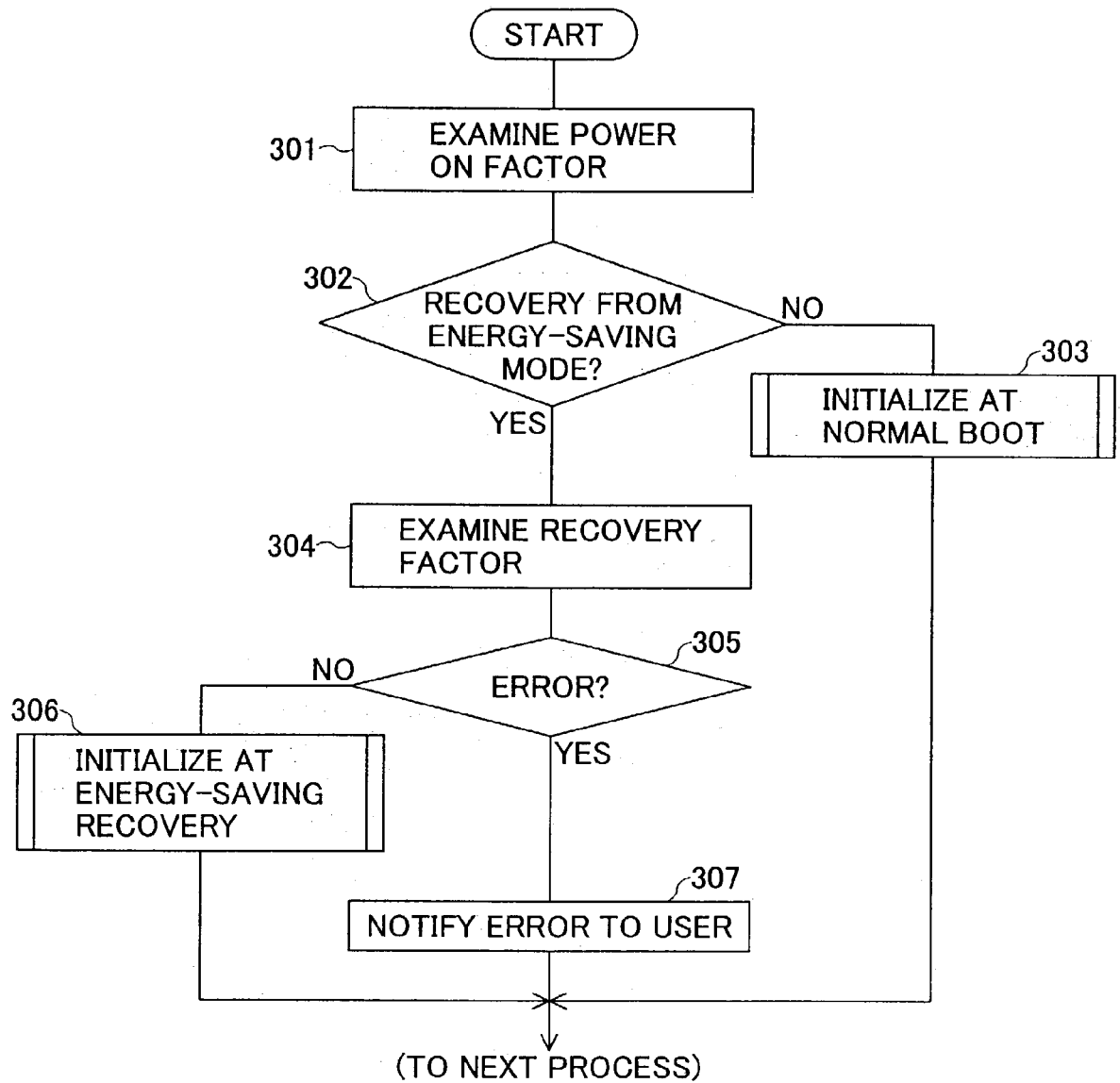
FIG. 7 is a flowchart illustrating a procedure that the system control part performs at a boot.

FIG. 7 shows a procedure that the system control part 1 performs at the boot.

At step 301, the system control part 1 determines whether the power supply to the system control part 1 becomes ON due to the cancellation of the energy-saving mode or other factors. That can be determined based upon information provided by the power supply control part 14.

At step 302, if it is determined that the system control part 1 is switched on due to a factor other than the cancellation of the energy-saving mode, that is, the condition at step 302 is determined to be NO, the system control part 1 executes an initialization for a normal boot at step 303 and then moves to the next process.

If the condition at step 302 is determined to be YES, the system control part 1 examines why the G3 facsimile apparatus is booted at step 304. For example, the system control part 1 examines whether or not there are some errors such as a line disconnection at step 305.

If the condition at step 305 is determined to be YES, the system control part 1 shows a user the detected error on the operation display part 7 at step 307 and then moves to the next process.

If the condition at step 305 is determined to be NO, the system control part 1 performs an energy-saving recovery initialization process in which a process corresponding to the recovery factor is performed at step 306 and then moves to the next process.

Figure 8:
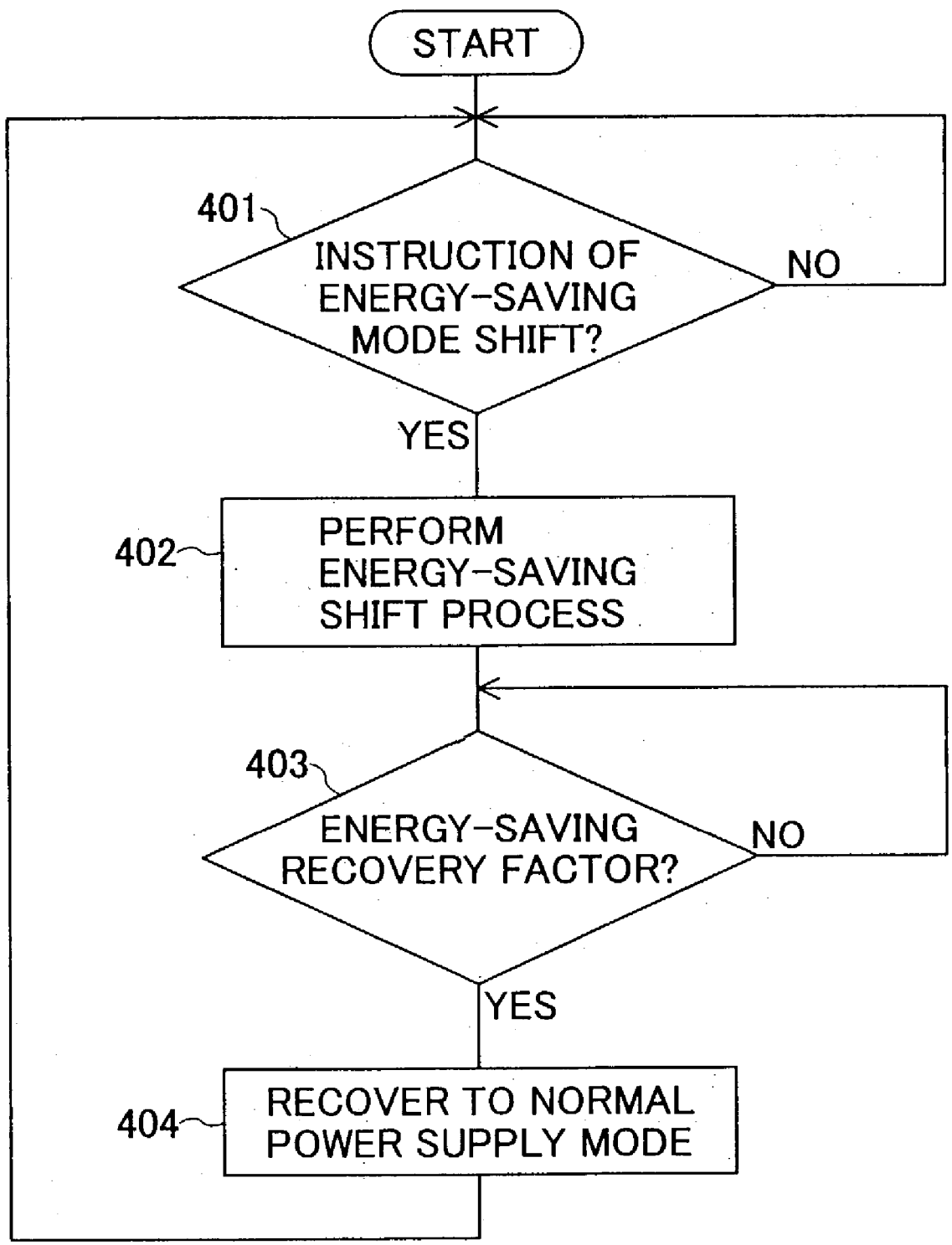
FIG. 8 is a flowchart illustrating a procedure performed by a power supply part.

FIG. 8 shows a procedure of the power supply control part 14.

At step 401, the power supply control part 14 examines whether or not the system control part 1 instructs the power supply control part 14 to shift to the energy-saving mode. If the condition is determined to be YES at step 401, the power supply control part 14 performs a predetermined energy-saving shift process at step 402.

When the power supply control part 14 shifts to the energy-saving mode, the power supply control part 14 waits in the NO loop at step 403 until there arises an energy-saving recovery factor. When the energy-saving recovery factor arises and the condition is changed into YES, the power supply control part 14 returns to its normal power supply mode and informs the system control part 1 of the energy-saving recovery factor at step 404 and returns to the step 401.

Figure 9:
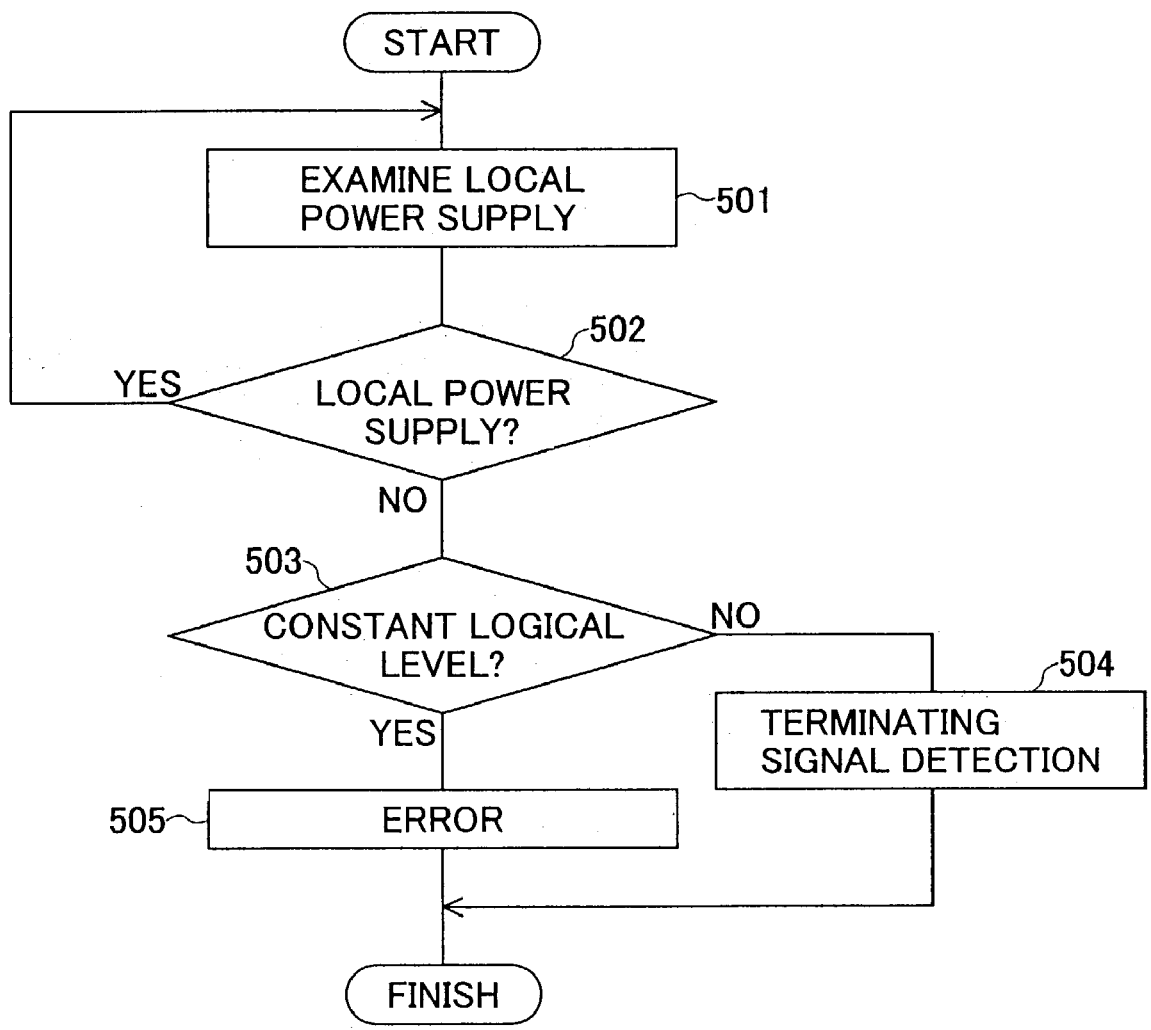
FIG. 9 is a flowchart illustrating a procedure that the power supply part performs so as to examine a terminating signal.

FIG. 9 shows a procedure that the power supply control part 14 performs with respect to a terminating signal inspection process.

At step 501, the power supply control part 14 examines whether or not a local power supply is detected based upon the detection signal DD of the photocoupler 30 if the local power supply is detected, that is, if the condition is determined to be YES at step 502, this detection process is repeated.

If the detection signal DD becomes LOW at the logical level and a local power supply is not detected, that is, if the condition is determined to be NO at step 502, the power supply control part examines whether or not the detection signal DD remains LOW at the logical level at step 503. When the detection signal DD alternates between HIGH and LOW at the logical level and the condition is NO at step 503, a terminating signal is detected at step 504, which means that the energy-saving recovery factor is detected.

On the other hand, if the condition is determined to be YES at step 503, it is concluded that a disconnection error has arisen at step 505. In this case, the energy-saving recovery factor is also detected.

As mentioned above, according to this embodiment of the present invention, it is possible to properly detect whether or not the signal line is connected to the line at the energy-saving mode.

The present invention is not limited to the specifically disclosed embodiments, and variations and modifications may be made without departing from the scope of the present invention.

The present application is based on Japanese priority applications No. 2001-387938 filed Dec. 20, 2001 and No. 2002-334744 filed Nov. 19, 2002, the entire contents of which are hereby incorporated by reference.

What is claimed is:

1. A facsimile apparatus for detecting a connection of said facsimile apparatus to a line, comprising:
   a network control device formed of a semiconductor DAA device having a primary line control part driven by a local power supply and a secondary serial interface circuit communicating with said primary line control part through a photocoupler; and
   a local power supply detecting part detecting the local power supply to said primary line control part,
   wherein said local power
   supply detecting part causes said secondary serial interface circuit to establish communication with said primary line control part, and said local power supply detecting part determines that local power is supplied when said communication is properly established and that the local power is not supplied when said communication is not properly established.

2. The facsimile apparatus as claimed in claim 1, wherein said local power supply detecting part provides an alert message to prompt a user to examine the connection of said facsimile apparatus to the line when said local power supply detecting part determines that no local power is supplied.

3. The facsimile apparatus as claimed in claim 1, wherein said local power supply detecting part ceases to execute a saving operation for image information to be transmitted when said local power supply detecting part determines that no local power is supplied.

4. The facsimile apparatus as claimed in claim 1, wherein said local power supply detecting part ceases to execute a transmitting operation for image information to be transmitted when said local power supply detecting part determines that no local power is supplied.

5. The facsimile apparatus as claimed in claim 1, wherein image information to be transmitted is transferred to another facsimile apparatus when said local power supply detecting part determines that no local power is supplied.

6. The facsimile apparatus as claimed in claim 1, wherein image information to be transmitted is transmitted via another line when said local power supply detecting part determines that no local power is supplied.

7. A facsimile apparatus for detecting a connection of said facsimile apparatus to a line, comprising: a network control device formed of a semiconductor DAA device having a primary line control part driven by a local power supply and a secondary serial interface circuit communicating with said primary line control part through a photocoupler; and local power supply detecting means for detecting the local power supply to said primary line control part, wherein said local power supply detecting means causes said secondary serial interface circuit to establish communication with said primary line control part, and said local power supply detecting means determines that local power is supplied when said communication is properly established and that the local power is not supplied when said communication is not properly established.

8. The facsimile apparatus as claimed in claim 7, wherein said local power supply detecting means provides an alert message to prompt a user to examine the connection of said facsimile apparatus to the line when said local power supply detecting means determines that no local power is supplied.

9. The facsimile apparatus as claimed in claim 7, wherein said local power supply detecting means ceases to execute a saving operation for image information to be transmitted when said local power supply detecting means determines that no local power is supplied.

10. The facsimile apparatus as claimed in claim 7, wherein said local power supply detecting means ceases to execute a transmitting operation for image information to be transmitted when said local power supply detecting means determines that no local power is supplied.

11. The facsimile apparatus as claimed in claim 7, wherein image information to be transmitted is transferred to another facsimile apparatus when said local power supply detecting means determines that no local power is supplied.

12. The facsimile apparatus as claimed in claim 7, wherein image information to be transmitted is transmitted via another line when said local power supply detecting means determines that no local power is supplied.

* * * * *